United States Patent [19]

Salvagnini

[11] Patent Number: 4,512,227
[45] Date of Patent: Apr. 23, 1985

[54] APPARATUS FOR THE AUTOMATIC SHEARING OF A SHEET METAL IN SEVERAL PIECES OF DIFFERENT SIZE

[75] Inventor: Guido Salvagnini, Sarego, Italy

[73] Assignee: Salvagnini Transferica S.p.A., Sarego, Italy

[21] Appl. No.: 443,694

[22] Filed: Nov. 22, 1982

[30] Foreign Application Priority Data

Nov. 25, 1981 [IT] Italy .............................. 25267 A/81

[51] Int. Cl.³ .............................................. B26D 7/06
[52] U.S. Cl. ...................................... 83/104; 83/112; 83/157; 83/277; 83/418
[58] Field of Search ................. 83/104, 107, 157, 373, 83/112, 155.1, 155, 206, 705, 278, 36, 418, 251, 277

[56] References Cited

U.S. PATENT DOCUMENTS

| | | | |
|---|---|---|---|
| 2,515,548 | 7/1950 | Brogren | 83/412 |
| 2,788,069 | 4/1957 | Noojin | 83/155 |
| 3,691,887 | 9/1972 | Roch | 83/277 |
| 3,793,916 | 2/1974 | Jarman | 83/155 |
| 3,916,742 | 11/1975 | Biernot | 83/157 |
| 4,040,318 | 8/1977 | Makeev | 83/157 |
| 4,235,139 | 11/1980 | Haenni | 83/418 |
| 4,297,927 | 11/1981 | Kuroda | 83/277 |
| 4,361,062 | 11/1982 | Reiff | 83/36 |
| 4,391,123 | 7/1983 | Salvagnini | 83/36 |

Primary Examiner—James M. Meister
Assistant Examiner—John L. Knoble
Attorney, Agent, or Firm—Stevens, Davis, Miller & Mosher

[57] ABSTRACT

Automatic shearing apparatus is provided which includes a shear provided with a shearing blade, a feeding unit for feeding sheet metal to the shear, and at least one movable carrier arranged downstream of the shearing blade. The movable carrier is controlled to receive and store the sheared pieces and then to return them to the feeding unit or, selectively, to cause the sheared pieces to reach a controlling device for sending to a piece discharge area. The feeding unit can be a manipulator, with rectilinear motion perpendicular to the shearing blade, and a rotator, both located upstream of the shearing blade. The manipulator and rotator function to receive, rotate and feed the metal sheets to be sheared, as well as to receive, rotate and refeed to the shear the sheared pieces returned by the movable carrier.

6 Claims, 6 Drawing Figures

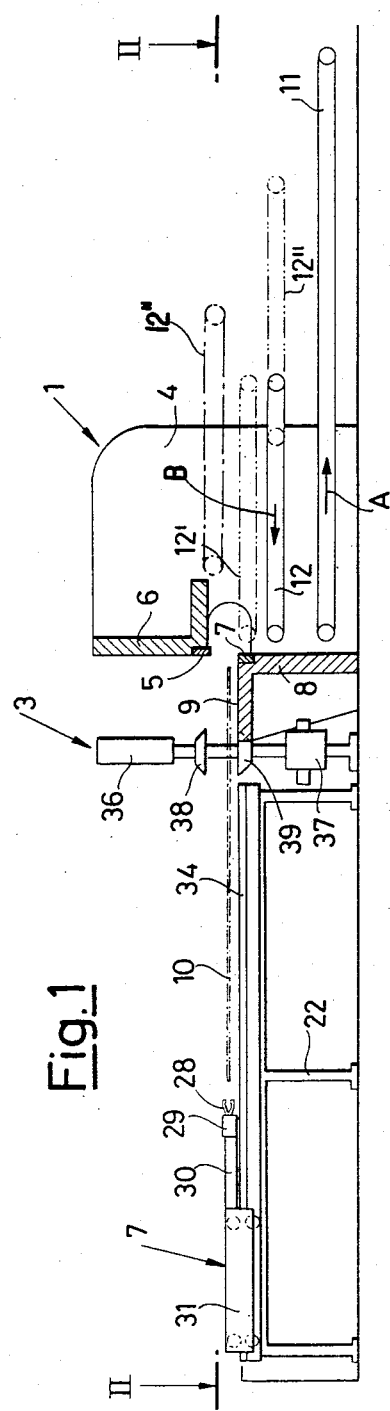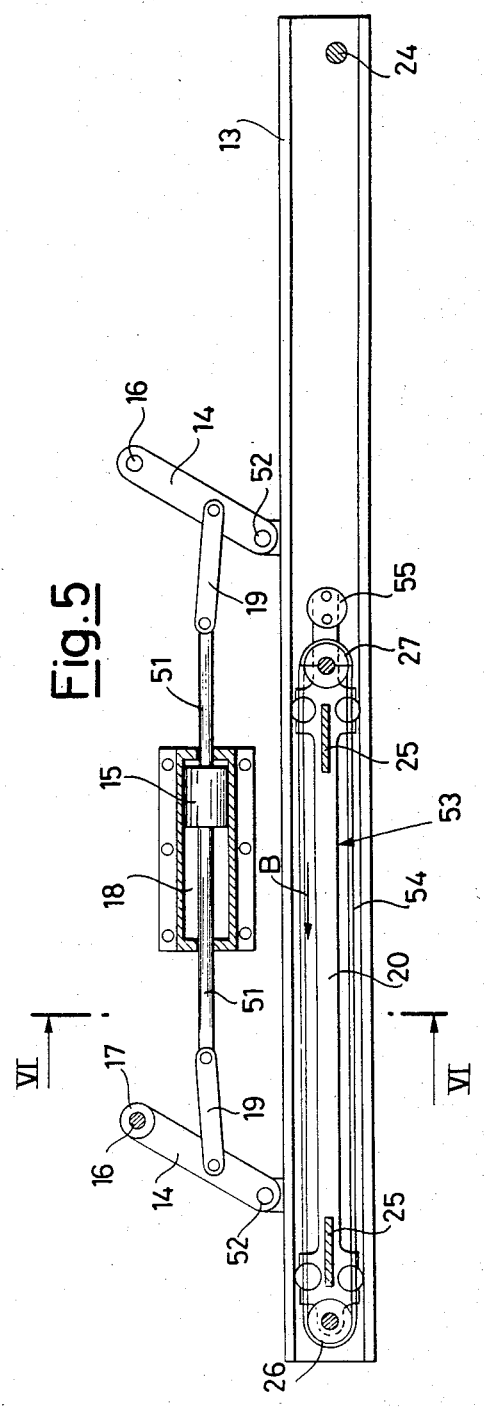

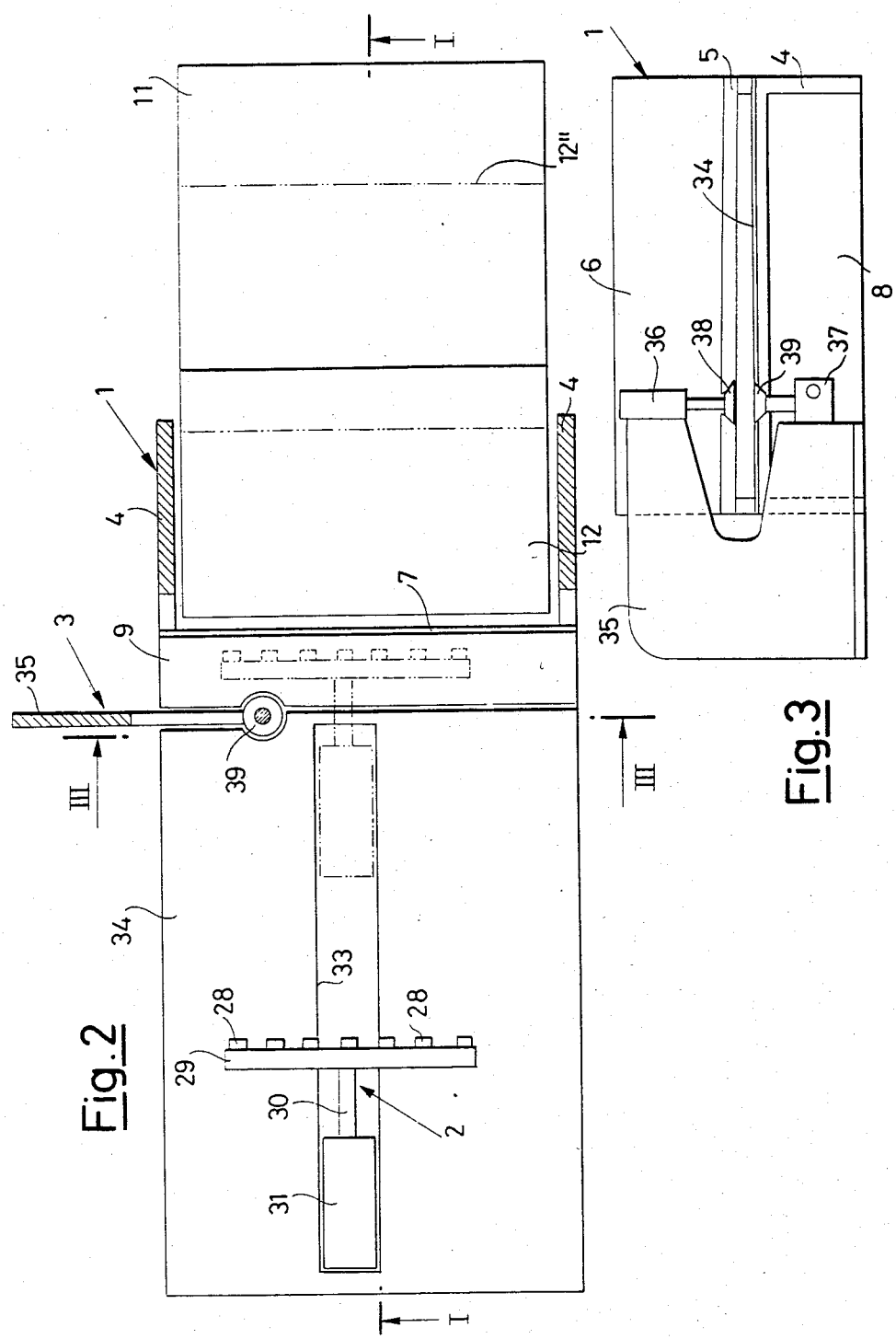

APPARATUS FOR THE AUTOMATIC SHEARING OF A SHEET METAL IN SEVERAL PIECES OF DIFFERENT SIZE

This invention relates to an apparatus for the automatic shearing of a sheet metal in several pieces of different size.

It is known that the usual sheet metal shears are still mostly fed manually.

Only some of them are provided with a manipulator with numerical control, which advances the metal sheet through programmed steps towards the shearing blade, which shears it in several rectangulare pieces, all of them having one side equal to one side of the starting sheet.

If one of the thus obtained pieces must be further subdivided in several parts by transversal shearings, this piece must be somehow recovered from the back of the shear or sent to a subsequent one.

It is evident that more various is the desired subdivision longer and more complicated is the work to be done.

As for the situation specified hereinabove, the purpose of this invention is to realize an apparatus which is able to perform in quick succession and without any manual intervention the programmed shearing of a sheet metal in several pieces of different size.

According to the invention such an object is achieved by an apparatus including a shear provided with a shearing blade, feeding means for feeding the sheet metal to the shear and at least one movable carrier associated to the shear downstream of the shearing blade and controlled in such a way as to receive and store the sheared pieces and then to return them to the feeding means or, selectively, to cause the sheared pieces to reach a discharge, characterized in that said movable carrier is movable from at least one working position near the shearing blade to a removed position in which it allows the sheared pieces to fall on an underlying collecting means for their sending to discharge.

In other words, the apparatus according to the invention is based mainly on a movable carrier, which according to a suitable predisposed program, causes the pieces already sheared in the desired size to come to discharge or accumulates temporarily the ones which have to undergo further shearing and then sends them back to feeding. The feeding means, preferably consituted by a manipulator with rectilinear motion with associated rotator but, if necessary, limited to a manipulator-rotator of known kind, provide for receiving the pieces thus sent back, rotating them of the desired angle (usually 90°) and feeding them again in rotated position to the shear for the subsequent shearing. The above specified sequence is then repeated until completion of the desired subdivision.

The change to execute any program of shearing a sheet metal in several pieces of different size is thus obtained without any manual intervention and by a single apparatus which can be completely and variously automatized.

The characteristics and advantages of this invention will become apparent upon consideration of the following detailed description of an embodiment thereof, which is illustrated by way of non-limiting example in the accompanying drawings, wherein:

FIG. 1 is a schematic representation of an apparatus according to the invention, in vertical section according to line I—I of FIG. 2;

FIG. 2 shows the same apparatus schematically represented in horizontal section according to line II—II of FIG. 1;

FIG. 3 shows said apparatus in cross section according to line III—III of FIG. 2;

FIG. 5 shows a side of said movable carrier, in section according to lines V—V of FIGS. 4 and 6.

Figure 4:
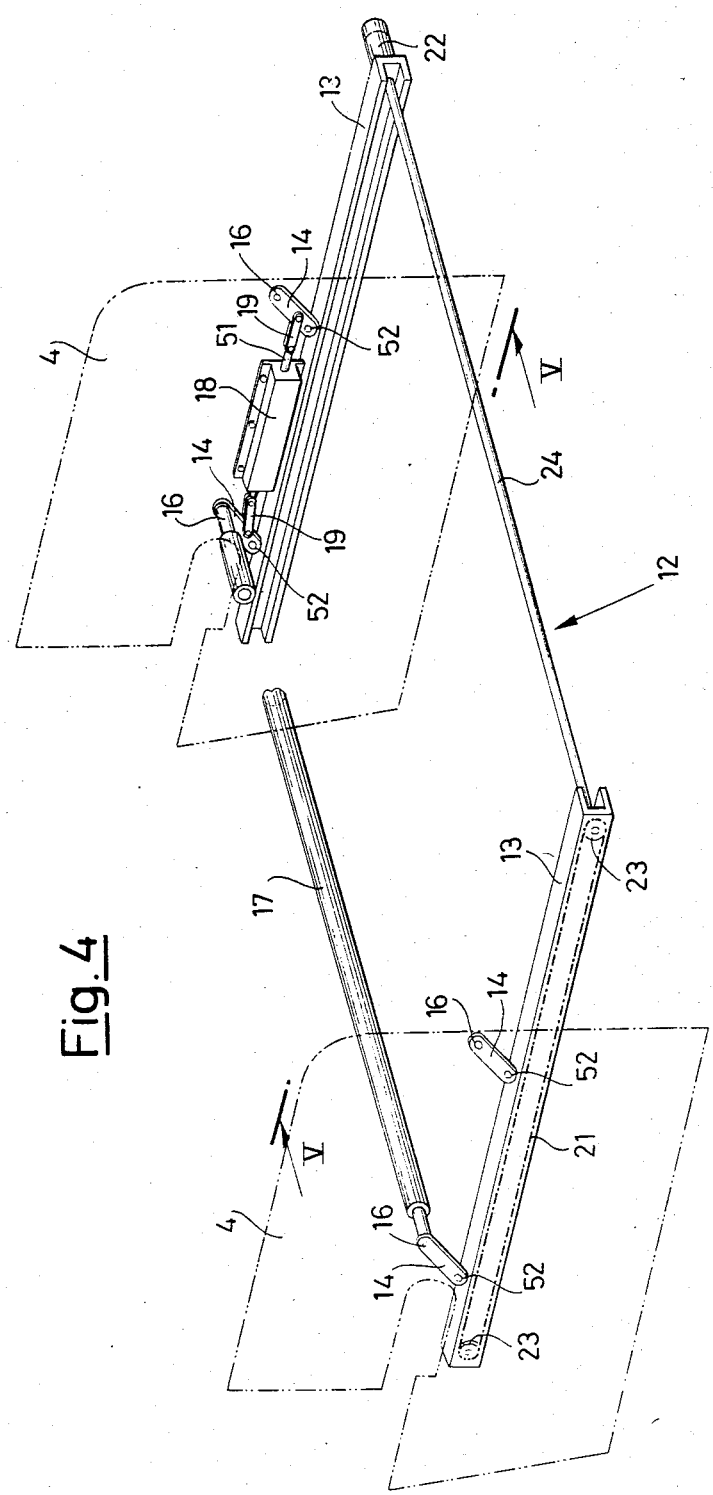
FIG. 4 shows schematically in perspective view a possible embodiment of the movable carrier used in said apparatus.

Referring to FIGS. 1 and 2, the apparatus illustrated therein substantially comprises a shear 1, a manipulator 2 with rectilinear motion and a rotator 3.

The shear 1 is mostly of conventional kind, i.e. it comprises two rigid side-walls 4, between which there are disposed a shearing blade 5 carried by a bar 6 provided with vertical motion and a counterblade 7 carried by a fixed bar 8 defining a front resting plane 9 for the sheet metal to be sheared, represented schematically at 10 in FIG. 1 and fed from left to right looking at FIGS. 1 and 2.

Immediately beyond the counterblade 7 and in lowered position with respect thereto, there are disposed two superimposed conveyors 11 and 12 of belt type or of pilgrim step type, which respectively operate as collecting and discharging means for the pieces sheared in the desired size and as a movable carrier for storing and sending back the pieces to be subjected to a further shearing.

The lower conveyor 11 can be operated by control in the rotation sense indicated by arrow A in FIG. 1, i.e. in such a sense as to provide for the discharge, from the rear of the shear, of the sheet metal pieces which deposite thereon after shearing.

The upper conveyor 12 can in its turn be operated by control in the sense of rotation indicated by arrow B in FIG. 1, i.e. in opposite sense with respect to that of feeding of the sheet metal, as well as in opposite sense with respect to that of arrow B.

Furthermore the upper conveyor 12 is movable vertically and horizontally between the lower position and near the counterblade 7, which is illustrated in continuous line in FIGS. 1 and 2, the upper position near counterblade 7, which is illustrated in dash and dot lines and indicated with numeral 12' in FIG. 1, and the lower position far from counterblade 7, which is illustrated in dash and dot lines and indicated with 12" in FIGS. 1 and 2.

An embodiment of the upper conveyor 12 and of the relative operating and moving means is illustrated in more details and in enlarged scale in FIGS. 3, 4 and 5. According to said figures, two horizontal beams 13 are disposed near and parallel to the sides 4 of the shear and each of them is supported in 52 by two levers 14 able to rotate a little angle around respective pivots 16 integral with the sides 4. The motion of levers 14 is controlled through a shaft 51 and rods 19 by a piston 15 located slidingly in a fluid cylinder 18 which is fastened to one of sides 4 (FIG. 5). A torsional bar 17 links integrally to one another two opposite levers 14, in such a way that all levers 14 rotate simultaneously the same angle, imparting to beams 13 a translatory motion according to a partially circular path between two outer positions, the one higher and advance towards the shear blade and the other lower and slightly moved back (positions 12' and 12 in FIG. 1).

Figure 6:
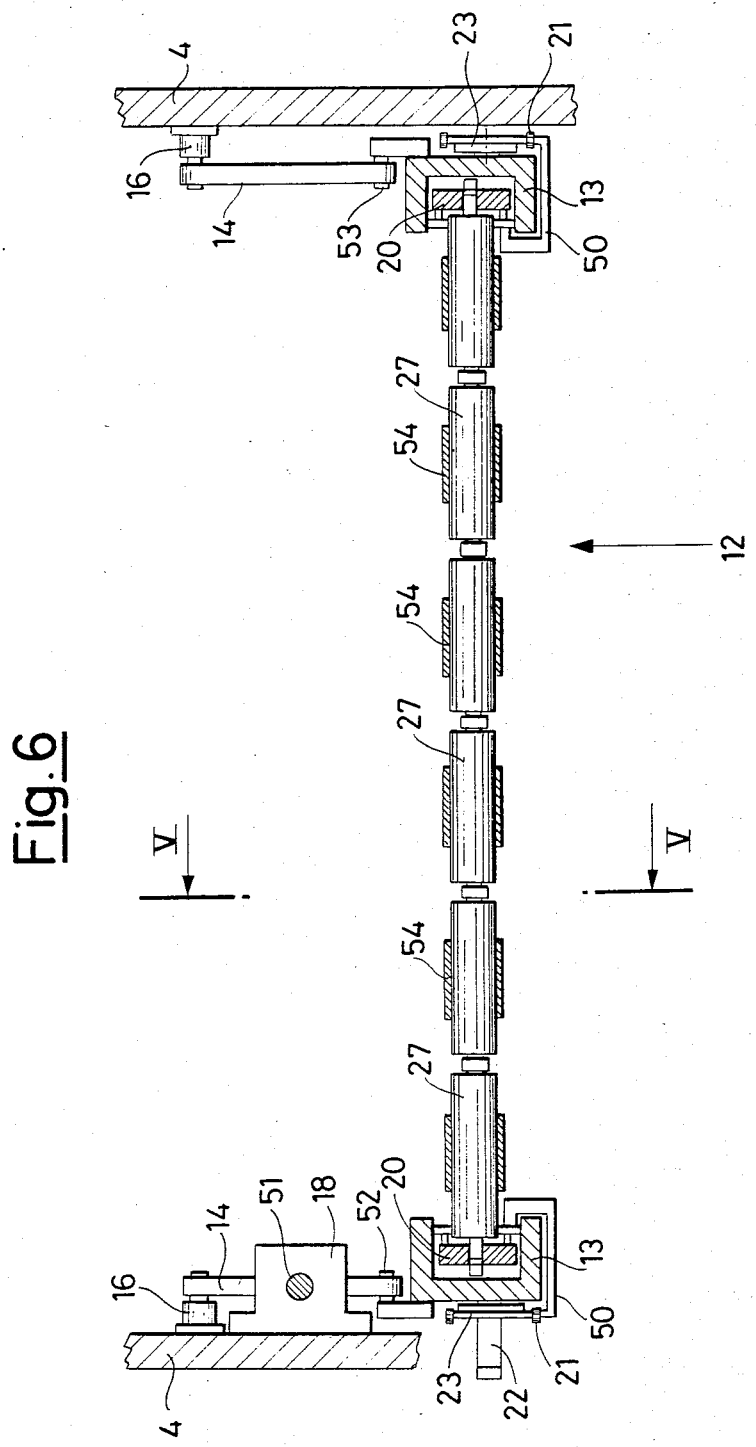
FIG. 6 shows said movable carrier in section according to line VI—VI of FIG. 5.

Each beam 13 slidingly carries a slide 20, that is fixed by a bracket 50 to a respective chain engaged at the ends with two fixed pinions 23 (FIGS. 4 and 6). Two opposite ones of said pinions are made integral with one another by a transmission shaft 24 (FIG. 4) driven by a motor 22, so that the two slides 20 are driven to move simultaneously and through equal steps along the respective beams 13.

The two slides 20 are also rigidly connected to one another by two crossbars 25, that together with the same slides constitute a rigid frame 53 carrying a sequence of rollers 26 along its front edge faced to the shearing blade 7 and a sequence of rollers 27 along its rear edge. Between the two sequences of rollers 26 and 27 some flexible belts 54 (FIGS. 5 and 6) are stretched, which are moved intermittently in the sense of arrow B, or in opposite sense, by a motor 55 connected to the sequence of roller 27.

Rollers 26 and 27 and flexible belts 54 constitute the actual conveyor, which by effect of the vertical motion of beams 13 and of the horizontal motion of slides 20 can reach all the positions necessary to allow the sheet metal pieces already sheared in the desired size to fall onto the underlying lower conveyor 11 or to collect and store provisionally those to be subjected to a further shearing (position 12 of FIG. 1) and to send them subsequently to the manipulating and shearing members 2 and 3 (position 12' of FIG. 1).

Other kinds of conveyors, in general, of movable carriers, can obviously be used to perform the functional characteristics of conveyor 12. One could use, for instance, instead of a belt conveyor, a conveyor of the so-called "pilgrim-step" kind.

Coming back to FIGS. 1 and 2, manipulator 2 includes in its turn a plurality of pliers 28 carried by a common transversal bar 29 connected by a longitudinal bar 30 to a sliding carriage 31. This latter is suitably driven, in a way not shown and known per se, on a fixed bed 32 and can advance through subsequent steps, and can also move back, between the position illustrated in continuous line in FIG. 2 and the one illustrated in dash and dot line in the same figure. Such an alternative rectilinear movement is allowed by a central slit 33 of a table 34 put as an extension of the resting plane 9 of the shear, the pliers 28 being above said table and the bed 32 being beneath the same.

The rotator 3 finally comprises a C-shaped carrier 35, whose upper and lower wings respectively support devices 36 and 37 (FIG. 3) carrying respective overlapped disks 38 and 39 fitted to act as co-operating jaws with respect to an interposed sheet metal 10. More precisely, device 36 is able to operate on the upper disk 38 in such a way as to move it vertically towards and away the inferior disk 39, allowing it in the meantime a free rotation around its own axis, while device 37 is able to operate on the lower disk 39 in such a way as to cause its rotation, for instance of 90° or 180°, in one sense or in the other. That is, the devices 36 and 37 are of the kind specified in the Italian Patent Application No. 27666 A/77 of Sept. 19, 1977, in the name of the same applicant of this application, to which reference is made for further details.

By a suitably programmed electronic box the illustrated apparatus is caused to operate as follows. Once the sheet metal is charged on the table 34 and on the resting plane 9, the manipulator 2 is driven in such a way that its pliers 28 grip the rear edge of the same sheet, pushing the latters progressively towards the shearing area of shear 1, defined by the blade 5 and by the cooperating counterblade 7.

The starting sheet is thus subdivided by parallel transversal shearings into a series of pieces, which the conveyors 11 and 12 collect in a different way depending on whether they have already the desired size or not. In the first case, by operating the motor 22, the conveyor 12 is moved horizontally towards the position 12" of FIG. 1, so that the sheared pieces can fall on the underlying conveyor 11 and be sent to discharge by this latter. In the second case, on the contrary, the conveyor 12 is left in the position illustrated in continuous line in FIGS. 1 and 2 and, by the motor 55, the flexible belts 54 are progressively advanced step by step in opposite sense with respect to the one of arrow B of FIG. 1, so that the various sheet metal pieces deposit thereon with roofing-tile arrangement. Between a shearing and the other the sheet can be rotated of 90°.

When the first series of shearings has been ended, the conveyor 12 is lifted up by the cylinder 18 in the position 12' of FIG. 1, i.e. at the level of counterblade 7, and furthermore its flexible belts 54 are moved in the direction of arrow B in such a way as to bring the edge to the last received piece within the reach of the pliers 28 of manipulator 2. This latter grips the above mentioned edge and, going back from right to left as looking at FIGS. 1 and 2, draws the relative piece from the shear, bringing it between the two overlapping disks 38 and 39 of rotator 3. The device 36, substantially a hydraulic cylinder, subsequently causes the upper disk 38 to descend towards the lower disk 39 to block the sheet metal just drawn out. Once all this has occured, the device 37 causes the rotation of 90° of the above mentioned piece in one sense or in the other, while the manipulator 2 has in the meantime arrived to the stroke end (position illustrated in continuous line in FIG. 1) or in another position moved back enough to avoid any interference with the rotation imparted by rotator 3. The rotated piece is then caused to be engaged again by the pliers of manipulator 2, set free from disks 38, 39 and to be fed again in the new position to the shear in order to carry out a new series of parallel shearings, transversal to the first ones, according to the pre-arranged program. The pieces deriving from this second shearing can be discharged in their turn by the conveyor 11 or stored on the conveyor 12 depending on whether they have reached the final size destined to them or not.

The pieces stored on the conveyor 12 are sent one by one to the manipulator 2, rotated by rotator 3 and fed again to shear 1 until the end of the shearing program.

It is to be noticed that every time a stored piece is taken back by the manipulator 2 the position of the same piece with respect to the shear blade is not well defined, because the previous fall of the piece on the conveyor 12 and its subsequent displacement towards the pliers of the manipulator can cause some displacement with respect to the ideal lying position. Therefore on the face of the shear some removable projections are preferably provided, against which the manipulator 2 pushes the pieces before closing the pliers.

According to a different but equivalent solution the position 12" of the upper conveyor 12 is arranged above the shearing blade 5 and far enough from the same in the horizontal direction to avoid any interference with the movable structure carrying the shearing blade 5. In this case the means which move the upper conveyor 12 are construed in such a way that the possible vertical positions are three instead of two, whereas the horizontal positions are still two but more close each other than in the previous case; this construction offers the advantage of a shorter time of displacement and of a smaller encumbrance.

I claim:

1. Apparatus for automatic shearing of sheet metal in a plurality of pieces of variable size, comprising a shear having a shearing blade, feeding means for feeding a piece of sheet metal to the shear, at least one movable carrier disposed downstream of the shearing blade and means for selectively causing the movable carrier during a first operation mode to receive and store sheared pieces of sheet metal for their subsequent return to the feeding means and during a second operation mode to allow sheared pieces to reach a discharge means, said movable carrier being disposed during said first operation mode in at least one piece-receiving working position near the shearing blade and during said second operation mode in a non-piece receiving removed position at a distance from the shearing blade such that sheared pieces are prevented from reaching said movable carrier and are allowed to fall on an underlying collecting means for sending sheared pieces to said discharge means.

2. Apparatus according to claim 1, wherein said movable carrier comprises an upper conveyor having two working positions comprising a lower working position to receive and store sheared pieces and an upper working position to return sheared pieces to the feeding means.

3. Apparatus according to claim 2, wherein said removed position is located a distance from the shearing blade in a horizontal direction.

4. Apparatus according to claim 2, wherein said removed position is disposed above the shearing blade.

5. Apparatus according to claim 2, wherein said collecting means comprises a lower conveyor located beneath said upper conveyor.

6. Apparatus according to claim 1, wherein said feeding means comprises an alternative rectilinear manipulator for feeding sheet metal towards the shearing blade and for recovering sheared sheets returned by said movable carrier and a rotator for rotating returned sheets through a desired angle.

* * * * *